(12) United States Patent
Kvesic

(10) Patent No.: US 6,821,623 B2
(45) Date of Patent: Nov. 23, 2004

(54) RECYCLED RUBBER PRODUCTS

(75) Inventor: Peter Kvesic, Elmira, OR (US)

(73) Assignee: Ryvec, Inc., Anaheim, CA (US)

( * ) Notice: Subject to any disclaimer, the term of this patent is extended or adjusted under 35 U.S.C. 154(b) by 105 days.

(21) Appl. No.: 10/135,498

(22) Filed: Apr. 29, 2002

(65) Prior Publication Data

US 2003/0203208 A1 Oct. 30, 2003

(51) Int. Cl.$^7$ .............................. B32B 5/16; B05D 3/00
(52) U.S. Cl. ...................... 428/407; 427/222; 427/322; 427/407.1
(58) Field of Search ................. 427/222, 322, 427/407.1; 428/407

(56) References Cited

U.S. PATENT DOCUMENTS

| | | |
|---|---|---|
| 4,112,176 A | 9/1978 | Bailey |
| 4,160,866 A | 7/1979 | Brooks et al. |
| 4,279,439 A | 7/1981 | Cantieri |
| 4,337,283 A | 6/1982 | Haas, Jr. |
| 4,438,221 A | 3/1984 | Fracalossi et al. |
| 4,608,420 A | 8/1986 | Brindöpke et al. |
| 4,833,205 A * | 5/1989 | Bauman et al. ............. 525/123 |
| 4,970,043 A * | 11/1990 | Doan et al. ................. 264/237 |
| 5,151,230 A * | 9/1992 | Damberg ...................... 264/83 |
| 5,397,825 A * | 3/1995 | Segrest ........................ 524/270 |
| 5,425,904 A * | 6/1995 | Smits .......................... 264/115 |
| 5,472,743 A * | 12/1995 | Daluise ....................... 427/426 |
| 5,514,722 A | 5/1996 | Di Geronimo |
| 5,604,277 A * | 2/1997 | Osborn ........................ 524/270 |
| 5,605,721 A | 2/1997 | Di Geronimo |
| 5,648,031 A | 7/1997 | Sturtevant et al. |
| 5,714,219 A | 2/1998 | Mashunkashey et al. |
| 5,880,165 A | 3/1999 | Triolo et al. |
| 5,899,519 A | 5/1999 | Doshi |
| 5,936,055 A | 8/1999 | Elwell et al. |
| 6,036,998 A * | 3/2000 | Calvo et al. ................. 427/214 |
| 6,265,454 B1 * | 7/2001 | McNutt et al. ................ 521/41 |
| 6,579,482 B1 * | 6/2003 | Faust et al. .................. 264/122 |
| 6,596,208 B1 * | 7/2003 | Glick et al. .................... 264/78 |

* cited by examiner

Primary Examiner—H. Thi Le
(74) Attorney, Agent, or Firm—Knobbe Martens Olson & Bear LLP

(57) ABSTRACT

Recycled rubber products are made in a two step process. In the first step, ground rubber is treated with a polyurethane binder to make a treated rubber. In the second step, the treated rubber is mixed with additional polyurethane binder and molded into finished products. This method uses less polyurethane binder than the conventional process, but the products have higher tensile strengths. The molding time is also reduced because of the reduced amount of polyurethane binder used.

17 Claims, No Drawings

RECYCLED RUBBER PRODUCTS

BACKGROUND OF THE INVENTION

1. Field of the Invention

This invention generally relates to recycled rubber products and more particularly to composites made from ground rubber particles and polyurethane binders.

2. Description of the Related Art

Old tires and other rubber articles may be ground into rubber particles suitable for recycling. This ground rubber is also known as crumb rubber. At the present time in the United States, Canada, and Mexico, over 20 million pounds of recycled rubber are used each month. Recycled rubber is used to produce many finished goods, including welcome mats, animal mats, truck-bed liner mats, playground mats, speed bumps, railroad crossing pads, running tracks, and bases for traffic control devices. Presently, finished goods produced from recycled rubber are made by either vulcanizing the rubber or by making composites using ground rubber and polyurethane binders.

In the vulcanizing process, the rubber is first dried to reduce the water content to less than 0.5%. The rubber is then vulcanized with sulfur. In some cases, the rubber is first treated to give a product with higher tensile strength. Rubber treated for vulcanization cannot be used in the polyurethane binder process.

Many types of binders are used in the polyurethane binder process. The terms "polyurethane binder" and "binder" are used interchangeably herein. The cost of these binders ranges from about $0.70 per pound to about $1.40 per pound. In the commercial process, the ground rubber is mixed with from about 3% to 20% of the binder, and the mixture is molded into the finished product. The process may be run under a variety of conditions, for example high heat and high pressure or low heat and low pressure. Dry rubber, rubber containing less than 0.5% water, is desirable, but not necessary. A finished product made with rubber with a high water content has lower tensile strength than one made with dry rubber, however. Most commercial crumb rubber contains more than 1% water, and few manufacturers dry the rubber.

SUMMARY OF THE INVENTION

The preferred embodiments of the invention provide methods of making composites from ground rubber and polyurethane binders. In one aspect, such methods use less binder than the conventional polyurethane binder method, while providing products having high tensile strengths. The reduced amount of binder also reduces the curing time.

A second embodiment relates to a method of treating rubber particles with polyurethane. These treated rubber particles are used to make molded composite products.

A third embodiment relates to recycled rubber products made from ground rubber and polyurethane binders. These products have high tensile strength compared to similar products made with the conventional process using the same proportion of rubber and binder.

A fourth embodiment relates to polyurethane-coated rubber particles. Additional binder may be added to these coated or treated rubber particles to make recycled rubber products. A pigment or dye may be added in the coating step to make colored rubber particles. These particles are also suitable for loose-fill applications.

DETAILED DESCRIPTION OF THE PREFERRED EMBODIMENTS

As used herein, the term "binder" means "polyurethane binder." Unless otherwise indicated, all percentages are by weight.

Preferred methods have at least two steps. First, a treatment step in which the ground rubber is treated with a polyurethane binder. This first step is called "coating" or "treating" the rubber. The product of this first step is called "coated" or "treated" rubber. In a second step, a forming step, the treated rubber is mixed with additional polyurethane binder and molded into finished products.

Typically, the rubber comes from car, truck, or tractor tires, but any type of rubber may be used. The rubber is ground to a size of between about 8 mesh to about 40 mesh depending on the finished product desired. The ground rubber can be used with or without nylon cord content, but is preferably free of metal content.

Any type of polyurethane binder suitable for rubber applications may be used in the preferred process, for example one-part, two-part, or latex binders. Some binders comprise extenders and are more economical. In cold-cure processes, 100% polyurethane binders are preferred. Binders may be selected for particular properties, such as reaction characteristics, hardness, and the like. Optimizing binder selection is well known in the art, such that binder selection optimization in accordance with the preferred embodiments may be performed in view of the disclosure herein without undue experimentation.

The first or treatment step does not require dry rubber. The ground rubber is mixed with from about 0.25% to about 1.5% of a polyurethane binder until the binder is reacted and the rubber is free of clumps. In a preferred embodiment, about 1% of the binder is used. Substantially any binder may be used in this step. Suitable binders for rubber applications are well known in the art, for example MD-400 and MD-403 binders (Ryvec, Inc., Anaheim, Calif.), and may be used in accordance with the preferred embodiments. Preferably, a fast reaction binder is used in this step. A dye or pigment may optionally be added in this step to color the rubber.

Mixing may be performed from ambient temperature to about 300° F. for from about 1 minute to about 3 hours. Higher temperatures typically require shorter mixing times, and vice versa. For example, using 1% binder, the mixing time at ambient temperature, 100° F., 150° F., and 200° F. is about 2 hours, about 1 hour, about 15 minutes, and about 8 minutes, respectively. Preferably, the mixing is performed from about 100° F. to about 200° F. for from 5 minutes to about 30 minutes. Suitable mixing means are well known in the art, for example, high-speed mixers, ribbon mixers, mixer-extruders, mortar mixers, and the like. High-speed mixers can generate temperatures up to about 180° F. without additional heating. Mortar mixers are preferably jacketed. Preferably, a ribbon mixer is used. More preferably, the ribbon mixer is equipped with a double spiral ribbon (a double ribbon mixer). Even more preferably, the double ribbon mixer is jacketed. Ribbon mixers are available in a range of sizes. The speed of a ribbon mixer ranges from about 50 rpm to about 120 rpm. The preferred speed depends on the width of the paddles, with wider paddles requiring slower speeds for equivalent mixing results. Optimizing the mixing conditions is within the scope of the skilled artisan in view of the disclosure herein.

In the second or forming step, the treated rubber from the first step is mixed with additional binder, and the mixture is molded into finished products. The forming step is similar to the commercial process except that treated rubber in used instead of untreated rubber. Accordingly, performing and optimizing the forming step is within the scope of the skilled artisan in view of the disclosure herein.

Substantially any type of binder may be used in the forming step. Selecting suitable binders is well known in the art. Preferably, from about 1% to 3% binder is used in this step. The binder used in this step may be the same or different from the binder used in the first step. A dye or pigment may optionally be added in this step. As in the treatment step, any type of mixer known in the art may be used in the forming step, for example, high-speed mixers, ribbon mixers, mixer-extruders, mortar mixers, and the like. The treated rubber, binder, and optional pigment is mixed until substantially uniform, typically, about one minute. Typically, the resulting mixture is then placed into a mold, by weight or by volume, and leveled.

Molding may be performed at a variety of temperatures and pressures, as is well known in the art. Preferably, the product is molded under pressure and heat ("cooked") using, for example, a hydraulic press with heated platens. The platens may be heated by any means known in the art, for example, steam, oil, or electricity. If the product is cold-cured, little pressure is generally used. Preferably, the molding is performed at from about 200° F. to about 400° F., more preferably, from about 300° F. to about 400° F. The conditions under which the molding is performed—for example, the amount of binder, type of binder, time, pressure, and temperature at which the product is molded—affects the properties of the product. For example, increasing the molding pressure typically increases the tensile strength of the product. Preferably, the pressure is from about 75 psi to about 500 psi, more preferably from about 150 psi to about 300 psi. The molding time depends on a variety of factors including the particular binder used, the temperature of the raw materials, the temperature of the platens, and the thickness of the product. Determining particular conditions required to achieve the desired properties is within the knowledge of the skilled artisan in view of the disclosure herein.

Preferred embodiments of the processes disclosed herein preferably have one or more advantages over known processes. The total amount of binder used may be reduced, which reduces the cost. Embodiments in which the amount of binder is reduced in the second step have reduced processing times, thereby increasing the rate of production. Products made according to the processes disclosed herein have increased tensile strength compared to products made using the same amount of binder using known processes.

Without being bound by any theory, this treatment step has two beneficial effects. First, the binder reacts with water in the rubber thereby drying the rubber. Second, the binder coats the rubber particles with polyurethane. When additional binder is added in the second step, it binds to polyurethane instead of rubber, which leads to the higher tensile strengths observed in the finished products made by the disclosed processes.

Treated Rubber

Ground rubber was preheated to 150° F. and combined with 1% MDF-403 binder (Ryvec, Inc., Anaheim, Calif.) with constant mixing in a jacketed ribbon mixer equipped with a double spiral ribbon. Treatment was complete in about 15 minutes.

Animal Mats 100 lb of 1% treated rubber was mixed with 15 lb MD-400 binder (Ryvec, Inc., Anaheim, Calif.) for 1 minute. The mixture was placed into molds (¾"×4'×8') and leveled. The molds were placed into a press with heated platens for 7 minutes at 150 psi and 280° F. The mats reached full tensile strength in about 24 hours.

Comparative Results

These results compare finished rubber mats made by the disclosed process and by the commercial process. For each set of conditions, three ¼"×6"×6" mats were molded, and three samples were cut from each mat for tensile strength testing (nine samples for each set of conditions). The "Rubber" column indicates the conditions under which the treatment step was performed. The "Binder," "Temp.," "Time," and "Mold Pressure" columns indicate the conditions under which the forming step was performed. The "Tensile Strength" column indicates the average tensile strength for mats made under the specified conditions.

Table 1 compares the effect of using different amounts of binder in the treatment step. For the treated rubber, the amount of binder used in the forming step was adjusted such that the total amount of binder used was 2.5%. For the standard and dried rubber, 3% binder was used. The rubber used in these tests contained large amounts of nylon. The treatment and forming steps use different binders in these examples.

TABLE 1

| | Rubber[a] | Binder[b] | Temp. | Time | Mold Pressure | Tensile Strength |
|---|---|---|---|---|---|---|
| 1 | Standard | 3.00% | 300° F. | 2 min | 150 psi | 215 psi |
| 2 | Dried | 3.00% | 300° F. | 2 min | 150 psi | 224 psi |
| 3 | 0.25% Treated | 2.25% | 300° F. | 2 min | 150 psi | 249 psi |
| 4 | 0.50% Treated | 2.00% | 300° F. | 2 min | 150 psi | 261 psi |
| 5 | 1.00% Treated | 1.50% | 300° F. | 2 min | 150 psi | 265 psi |
| 6 | 1.50% Treated | 1.00% | 300° F. | 2 min | 150 psi | 264 psi |

[a]"Standard" refers to untreated rubber; "Dried" refers to rubber dried at 250° F. for 15 min.; "Treated" refers to rubber treated with the stated percentage of MD-403 binder (Ryvec, Inc., Anaheim, CA) for 15 min. at 150° F.
[b]MD-400 binder (Ryvec, Inc., Anaheim, CA).

As expected, mats molded from dried rubber (Example 2) are stronger than those molded from standard rubber (Example 1). As shown in Example 3, as little as 0.25% of binder in the treatment step increased the tensile strength of the product compared to the product made from either the standard or dried rubbers. The difference between tensile strength advantage for the treated rubber is probably greater than that indicated in this table because the total amount of binder used in the Examples 1 and 2 was 3%, while in the total amount used in Examples 3 to 6 was only 2.5%. The tensile strength of the product increases with the amount of binder used in the treatment step, up to about 1% binder under these conditions (compare Example 4 with Example 5).

Table 2 compares the tensile strengths of mats made from three types of rubber—standard, dried, and 1% treated—under varying molding conditions. The rubber in these tests contained less nylon than the rubber used in the tests described in Table 1.

TABLE 2

| | Rubber[a] | Binder[b] | Temp. | Time | Mold Pressure | Tensile Strength |
|---|---|---|---|---|---|---|
| 7 | Standard | 3% | 300° F. | 2 min | 150 psi | 229 psi |
| 8 | Dried | 3% | 300° F. | 2 min | 150 psi | 273 psi |
| 9 | Treated | 1.5% | 300° F. | 2 min | 150 psi | 302 psi |
| 10 | Standard | 3% | 300° F. | 2 min | 220 psi | 237 psi |
| 11 | Dried | 3% | 300° F. | 2 min | 220 psi | 283 psi |
| 12 | Treated | 3% | 300° F. | 2 min | 220 psi | 379 psi |
| 13 | Treated | 2% | 300° F. | 2 min | 220 psi | 351 psi |
| 14 | Treated | 1.5% | 300° F. | 2 min | 220 psi | 343 psi |
| 15 | Treated | 1% | 300° F. | 2 min | 220 psi | 282 psi |
| 16 | Standard | 3% | 300° F. | 2 min | 500 psi | 289 psi |
| 17 | Dried | 3% | 300° F. | 2 min | 500 psi | 346 psi |

TABLE 2-continued

| | Rubber[a] | Binder[b] | Temp. | Time | Mold Pressure | Tensile Strength |
|---|---|---|---|---|---|---|
| 18 | Treated | 3% | 300° F. | 2 min | 500 psi | 529 psi |
| 19 | Standard | 3% | 400° F. | 40 sec | 75 psi | 147 psi |
| 20 | Dried | 3% | 400° F. | 40 sec | 75 psi | 179 psi |
| 21 | Treated | 2% | 400° F. | 30 sec | 75 psi | 232 psi |
| 22 | Treated | 1.5% | 400° F. | 30 sec | 75 psi | 200 psi |
| 23 | Treated | 1.5% | 400° F. | 20 sec | 75 psi | 169 psi |

[a]"Standard" refers to untreated rubber; "Dried" refers to rubber dried at 250° F. for 15 min.; "Treated" refers to rubber treated with 1% MD-403 binder (Ryvec, Inc., Anaheim, CA) for 15 min, at 150° F.
[b]MD-400 binder (Ryvec, Inc., Anaheim, CA).

The tensile strength of the product increased in Examples 7, 8, and 9 for standard, dried, and treated rubber, respectively. Again, the total binder content in Example 9, 2.5%, was less that in Examples 7 and 8, 3%, and the Example 9 product is stronger. A direct comparison at constant binder content and identical molding conditions is provided in Examples 10, 11, and 13. Again, the treated rubber (Example 13) gives a stronger product than the dried rubber (Example 11), which in turn is stronger than standard rubber (Example 10).

The foregoing examples serve to illustrate the preferred embodiment and are not intended as limitations. Modifications and variations of the preferred embodiment will be apparent to those skilled in the art without departing from spirit of the invention, the scope of which is limited only by the appended claims.

What is claimed is:

1. A method of making recycled rubber products with less polyurethane binder reduced curing times, and high tensile strengths compared with equivalent products made by known polyurethane binder methods, the method comprising
   a treatment step comprising mixing ground rubber with a first polyurethane binder until the first polyurethane binder is reacted and the rubber is free of clumps, and
   a forming step comprising mixing the product of the treatment step with a second polyurethane binder and molding the resulting mixture.

2. The method of claim 1 using from about 0.25% to about 1.5% by weight of the first polyurethane binder.

3. The method of claim 2 comprising about 1% by weight of the first polyurethane binder.

4. The method of claim 1 wherein the treatment step is performed at an elevated temperature.

5. The method of claim 1 wherein the treatment step is performed at about 150° F.

6. The method of claim 1 wherein the first polyurethane binder is the same as the second polyurethane binder.

7. The method of claim 1 wherein the first polyurethane binder is different from the second polyurethane binder.

8. The method of claim 1 comprising from about 1% to about 3% by weight of the second polyurethane binder.

9. The method of claim 1 wherein the molding is performed at from about 200° F. to about 400° F.

10. The method of claim 1 wherein the molding is performed at from about 75 psi to about 500 psi.

11. The method of claim 1 wherein the treatment step further comprises mixing a dye or pigment with the ground rubber and the first polyurethane binder.

12. The method of claim 1 wherein the forming step further comprises mixing a dye or pigment with the ground rubber and the second polyurethane binder.

13. The method of claim 1 wherein the ground rubber contains nylon.

14. A method of making a composite of ground rubber and polyurethane comprising
   preparing a treated rubber by mixing ground rubber with a first polyurethane binder at an elevated temperature until the first polyurethane binder is reacted and the rubber is free of clumps, and
   mixing the treated rubber with a second polyurethane binder and molding the resulting mixture at elevated temperature and pressure.

15. A recycled rubber product with less polyurethane binder, reduced curing time, and high tensile strength compared with equivalent products made by known polyurethane binder methods, made by a method comprising
   a treatment step comprising mixing ground rubber with a first polyurethane binder until the first polyurethane binder is reacted and the rubber is free of clumps, and
   a forming step comprising mixing the product of the treatment step with a second polyurethane binder and molding the resulting mixture.

16. Polyurethane treated rubber particles comprising rubber particles coated with a cured polyurethane binder, wherein the treated rubber particles comprise from about 0.25% to about 1.5% by weight of the polyurethane binder.

17. The treated rubber particles of claim 16 further comprising a pigment or dye.

* * * * *